US 10,185,515 B2

(12) United States Patent
Shin et al.

(10) Patent No.: US 10,185,515 B2
(45) Date of Patent: Jan. 22, 2019

(54) UNIFIED MEMORY CONTROLLER FOR HETEROGENEOUS MEMORY ON A MULTI-CHIP PACKAGE

(71) Applicant: QUALCOMM Incorporated, San Diego, CA (US)

(72) Inventors: Hyunsuk Shin, San Diego, CA (US); Jung Pill Kim, San Diego, CA (US); Dexter Tamio Chun, San Diego, CA (US); Jungwon Suh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 566 days.

(21) Appl. No.: 14/016,717

(22) Filed: Sep. 3, 2013

(65) Prior Publication Data

US 2015/0067234 A1    Mar. 5, 2015

(51) Int. Cl.
*G06F 3/06* (2006.01)
*G06F 13/16* (2006.01)

(52) U.S. Cl.
CPC .......... *G06F 3/0658* (2013.01); *G06F 3/0604* (2013.01); *G06F 3/0683* (2013.01); *G06F 13/1694* (2013.01)

(58) Field of Classification Search
CPC .......... G06F 13/36; G06F 13/38; G06F 13/40
USPC ......................... 710/301–306, 100
See application file for complete search history.

(56) References Cited

U.S. PATENT DOCUMENTS

| 7,373,452 | B2 | 5/2008 | Suh |
| 7,778,101 | B2 | 8/2010 | Chen |
| 8,291,295 | B2 | 10/2012 | Harari et al. |
| 2001/0015905 | A1 | 8/2001 | Kim et al. |
| 2007/0147115 | A1* | 6/2007 | Lin ..................... G06F 13/1694 365/185.08 |
| 2008/0137399 | A1 | 6/2008 | Chan et al. |
| 2009/0024819 | A1 | 1/2009 | Fisher et al. |
| 2009/0132736 | A1* | 5/2009 | Hasan et al. ........ G06F 13/1605 710/56 |

(Continued)

FOREIGN PATENT DOCUMENTS

| CN | 1391166 A | 1/2003 |
| CN | 1885277 A | 12/2006 |
| CN | 101303885 | 11/2008 |

(Continued)

OTHER PUBLICATIONS

International Search Report and Written Opinion—PCT/US2014/045983—ISA/EPO—dated Sep. 30, 2014.

*Primary Examiner* — Tim T Vo
*Assistant Examiner* — Kim T. Huynh
(74) *Attorney, Agent, or Firm* — Qualcomm Incorporated/Seyfarth Shaw LLP

(57) ABSTRACT

An enhanced multi chip package (eMCP) is provided including a unified memory controller. The UMC is configured to manage different types of memory, such as NAND flash memory and DRAM on the eMCP. The UMC provides storage memory management, DRAM management, DRAM accessibility for storage memory management, and storage memory accessibility for DRAM management. The UMC also facilitates direct data copying from DRAM to storage memory and vice versa. The direct copying may be initiated by the UMC without interaction from a host, or may be initiated by a host.

25 Claims, 6 Drawing Sheets

(56) References Cited

U.S. PATENT DOCUMENTS

2009/0235003 A1  9/2009  Tanaka et al.

FOREIGN PATENT DOCUMENTS

| | | |
|---|---|---|
| CN | 101473438 A | 7/2009 |
| CN | 101611387 A | 12/2009 |
| JP | 2003091463 A | 3/2003 |
| JP | 2007183961 A | 7/2007 |
| JP | 2007183962 A | 7/2007 |
| JP | 2011070470 A | 4/2011 |
| WO | 2006132006 A1 | 12/2006 |
| WO | 2008086488 A2 | 7/2008 |

* cited by examiner

UNIFIED MEMORY CONTROLLER FOR HETEROGENEOUS MEMORY ON A MULTI-CHIP PACKAGE

TECHNICAL FIELD

The present disclosure generally relates to integrated storage devices. More specifically, the present disclosure relates to controlling multiple memory types on an integrated storage device.

BACKGROUND

A low cost heterogeneous memory apparatus including more than one type of memory may be configured on an embedded multi-chip package (eMCP). Current multi-chip package designs for heterogeneous memory devices generally include a storage memory portion including a NAND flash memory portion and a dynamic random-access memory (DRAM) portion on a single package. Depending on the circumstances, access to either NAND flash memory or DRAM memory may be more advantageous due to the comparative benefits and disadvantages of these different memory types. DRAM stores each bit of data in a separate capacitor within an integrated circuit. This structural simplicity allows DRAM to be implemented with very high densities. NAND flash memory is non-volatile and provides low power usage, small size, and extremely high performance. Unlike NAND flash memory, DRAM is volatile memory which loses its data quickly when power is removed.

Current multi-chip package designs for heterogeneous memory devices include a host interface for flash memory and a separate host interface for DRAM. Flash memory relies upon a separate controller and generally cannot be used by itself. The flash memory controller is generally coupled between the flash memory host interface and the flash memory. Unlike flash memory, current DRAM memories do not rely on a separate controller so DRAM may be connected directly to the DRAM host interface on the multi-chip package.

Multi-chip packages with both flash memory and DRAM provide a lower cost alternative to devices that include separate DRAM and flash memory.

SUMMARY

An apparatus according to an aspect of the present disclosure includes at least one first memory of a first memory type and at least one second memory of a second memory type different from the first memory type. The apparatus also includes a unified memory controller (UMC) coupled to the first memory and the second memory. The UMC includes a first interface between the first memory and a host and a second interface between the second memory and the host. The UMC is configured to access the first memory to control and utilize the second memory independent of the first interface.

An apparatus according to another aspect of the present disclosure includes at least one first memory of a first memory type and at least one second memory of a second memory type different from the first memory type. The apparatus also includes a unified memory controller (UMC) coupled to the first memory and the second memory. The UMC includes a first interface between the first memory and a host and a second interface between the second memory and the host. The UMC is configured to utilize the first memory to assist a host access to the second memory via the second interface.

A memory interface method according to another aspect of the present disclosure includes receiving information (such as data or a request for data) from a host on a first host interface of a multi-chip package. The information can be a request for data stored in a first memory of a first memory type on the multi-chip package. The information can also data to be stored in the first memory on the multi-chip package. The method also includes accessing a second memory of a second memory type on the multi-chip package independently of a second host interface of the multi-chip package to assist with the storage or retrieval of data in the first memory.

A memory interface apparatus according to another aspect of the present disclosure includes means for receiving data from a host on a first host interface of a multi-chip package for storage in a first memory of a first memory type on the multi-chip package. The apparatus also includes means for accessing a second memory of a second memory type on the multi-chip package independently of a second host interface of the multi-chip package to assist storage of the data in the first memory.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DESCRIPTION OF THE DRAWINGS

For a more complete understanding of the present disclosure, reference is now made to the following description taken in conjunction with the accompanying drawings.

DETAILED DESCRIPTION

Figure 1:
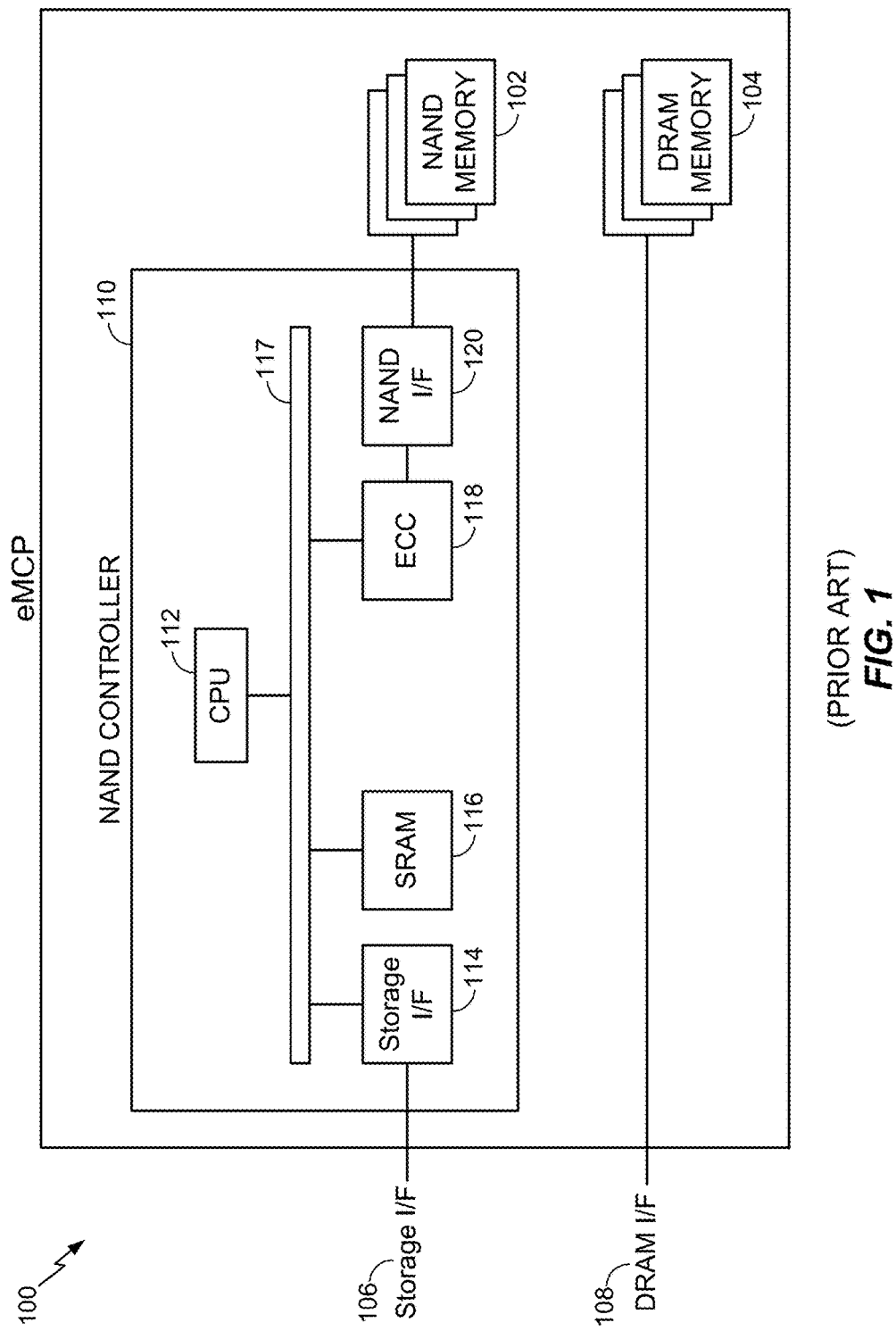
FIG. 1 is diagram of a prior-art enhanced multi-chip package (eMCP).

FIG. 1 illustrates an embedded multi-chip package (eMCP) 100 including heterogeneous memory. The heterogeneous memory includes a first memory 102 of a first memory type and a second memory 104 of a second memory type different from the first memory type. In the illustrated eMCP 100, the first memory 102 is a NAND storage memory and the second memory 104 is dynamic random access memory (DRAM). The eMCP 100 includes a first host interface 106 and a second host interface 108. A memory controller 110 on the eMCP 100 is coupled between the first host interface 106 and the first memory 102. The second host interface 108 is coupled directly to the second memory 104. The second memory 104 does not rely upon a controller circuit and cannot be managed the memory controller 110.

The memory controller 110 includes a central processing unit 112 coupled via a memory controller bus 117 to host interface circuitry 114, a static random access memory (SRAM) 116, error correction code circuitry (ECC) 118 and storage memory interface circuitry 120. The host interface circuitry 114 is coupled to the first host interface 106, and the storage memory interface circuitry 120 is coupled to the first memory 102.

Current eMCPs such as the eMCP 100 shown in FIG. 1 integrate storage memory such as a NAND flash memory and a second memory such as a DRAM memory into a single package. However, in current eMCP designs the two different memories do not generally interact with each other.

In the eMCP 100, the memory controller 110 performs several functions to support the NAND storage memory 102. One of the important functions of the memory controller 110 is to convert logical addresses that are received on a host interface to corresponding physical addresses in the NAND storage memory 102, for example. The mapping tables for this conversion are generally very large and consume a large amount of storage. In the eMCP 100, the SRAM 116 stores the large mapping tables. However, as the size of NAND storage memories increases the use of SRAM to store mapping tables is increasingly expensive. For example, to maintain satisfactory performance a 32 gigabyte (GB) NAND storage memory would use about 32 megabyte (MB) of SRAM or some other volatile memory to store mapping tables.

Unlike the NAND storage memory 102, a DRAM such as the second memory 104 in a current eMCP 100 generally does not rely on management by controller circuitry. In current eMCPs, such as the eMCP 100 shown in FIG. 1, the DRAM memory cannot be managed. However, it is widely anticipated that control of DRAM circuitry may be beneficial in the future. For example, as improved processes allow the size of DRAM cells to shrink further, the quality of future DRAM cells are expected to worsen. Thus, it is expected that DRAM will eventually rely on some management by controller circuitry to maintain acceptable performance.

Aspects of the present disclosure provide an eMCP including a unified memory controller (UMC) configured to manage different types of memory, such as NAND flash memory and DRAM on the eMCP. The unified memory controller provides storage memory management, DRAM management, DRAM accessibility for storage memory management, and storage memory accessibility for DRAM management. The unified memory controller also facilitates direct data copying from DRAM to storage memory and vice versa. The direct copying may be initiated by the unified memory controller without interaction from a host, or may be initiated by a host using special commands or modes, for example. According to aspects of the present disclosure, the eMCP includes separate host interfaces for storage memory and DRAM memory.

Figure 2A:
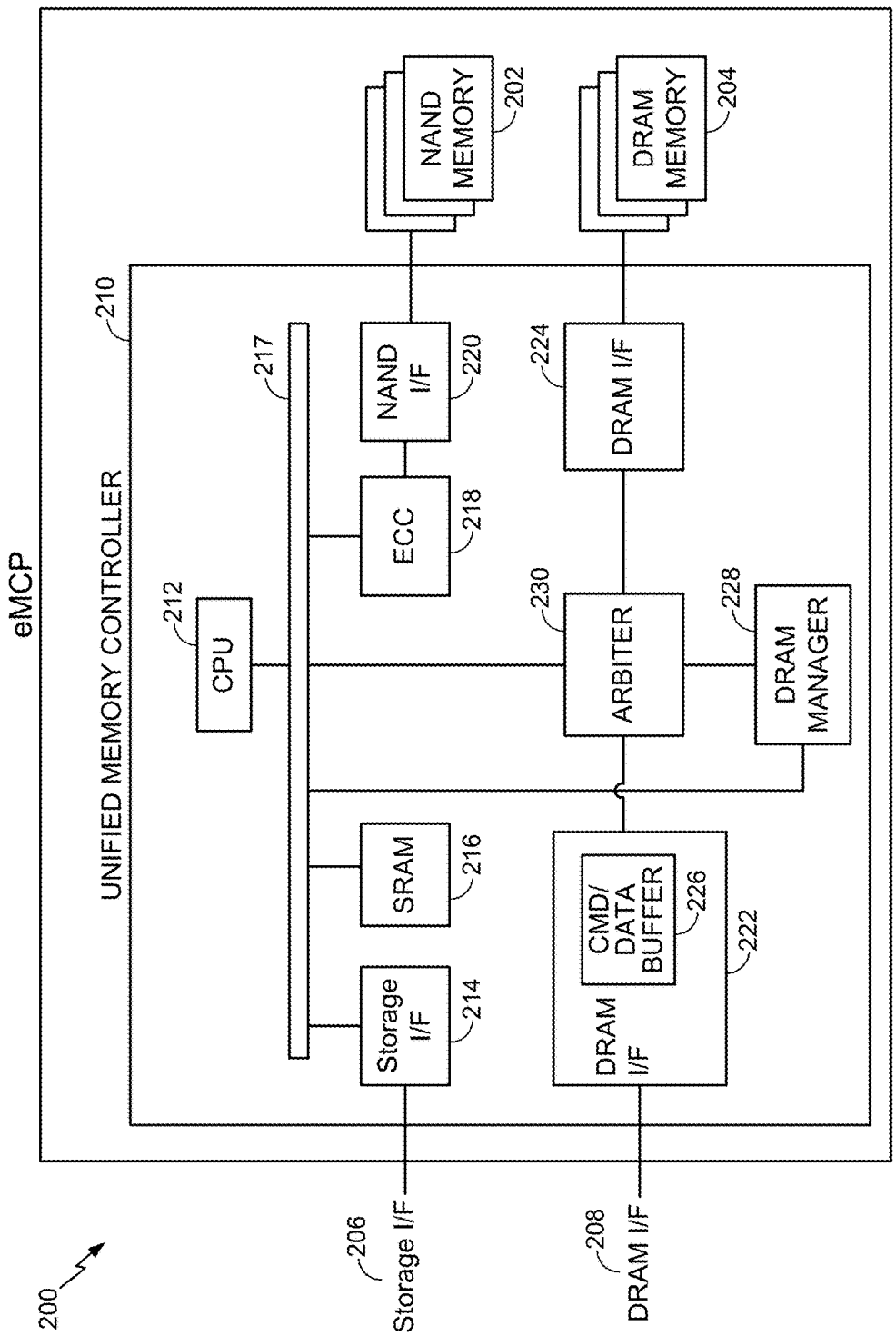
FIG. 2A is diagram of an enhanced multi-chip package (eMCP) including a unified memory controller (UMC) according to aspects of the present disclosure.

FIG. 2A, illustrates an eMCP 200 including heterogeneous memory that facilitates control of different memory types according to aspects of the present disclosure. Although the diagram shown in FIG. 2A shows each component of the eMCP 200 configured in a plane, it should be understood that the components may also be arranged by stacking with wire-bonding and/or through-silicon vias (TSV), for example. The heterogeneous memory includes a first memory 202 of a first memory type and a second memory 204 of a second memory type different from the first memory type. In the illustrated eMCP 200, the first memory 202 is a NAND storage memory and the second memory 204 is dynamic random access memory (DRAM). The eMCP 200 includes a first host interface 206 and a second host interface 208. A unified memory controller (UMC) 210 on the eMCP 200 is coupled between the first host interface 206 and the first memory 202 and between the second host interface 208 and the second memory 204.

The unified memory controller 210 includes a central processing unit (CPU) 212 coupled to first host interface circuitry 214, a static random access memory (SRAM) 216, and error correction code circuitry (ECC) 218 via a unified memory controller bus 217. First memory interface circuitry 220 is coupled to the ECC circuitry 218. The first host interface 206 is coupled to the first host interface circuitry 214 and the first memory 202 is coupled to the first memory interface circuitry 220. The unified memory controller 210 also includes second host interface circuitry 222 coupled to the second host interface 208 and second memory interface circuitry 224 (via arbiter circuitry 230) coupled to the second memory 204. The second host interface circuitry 222 includes a command data buffer 226 and is coupled to arbiter circuitry 230 in the unified memory controller 210.

According to an aspect of the present disclosure, the unified memory controller 210 also includes a DRAM manager 228 coupled to the bus 217 and the arbiter 230. The unified memory controller 210 extends the functionality of a NAND controller to also provide access by the unified memory controller 210 to the DRAM (e.g. second memory 204).

Figure 2B:
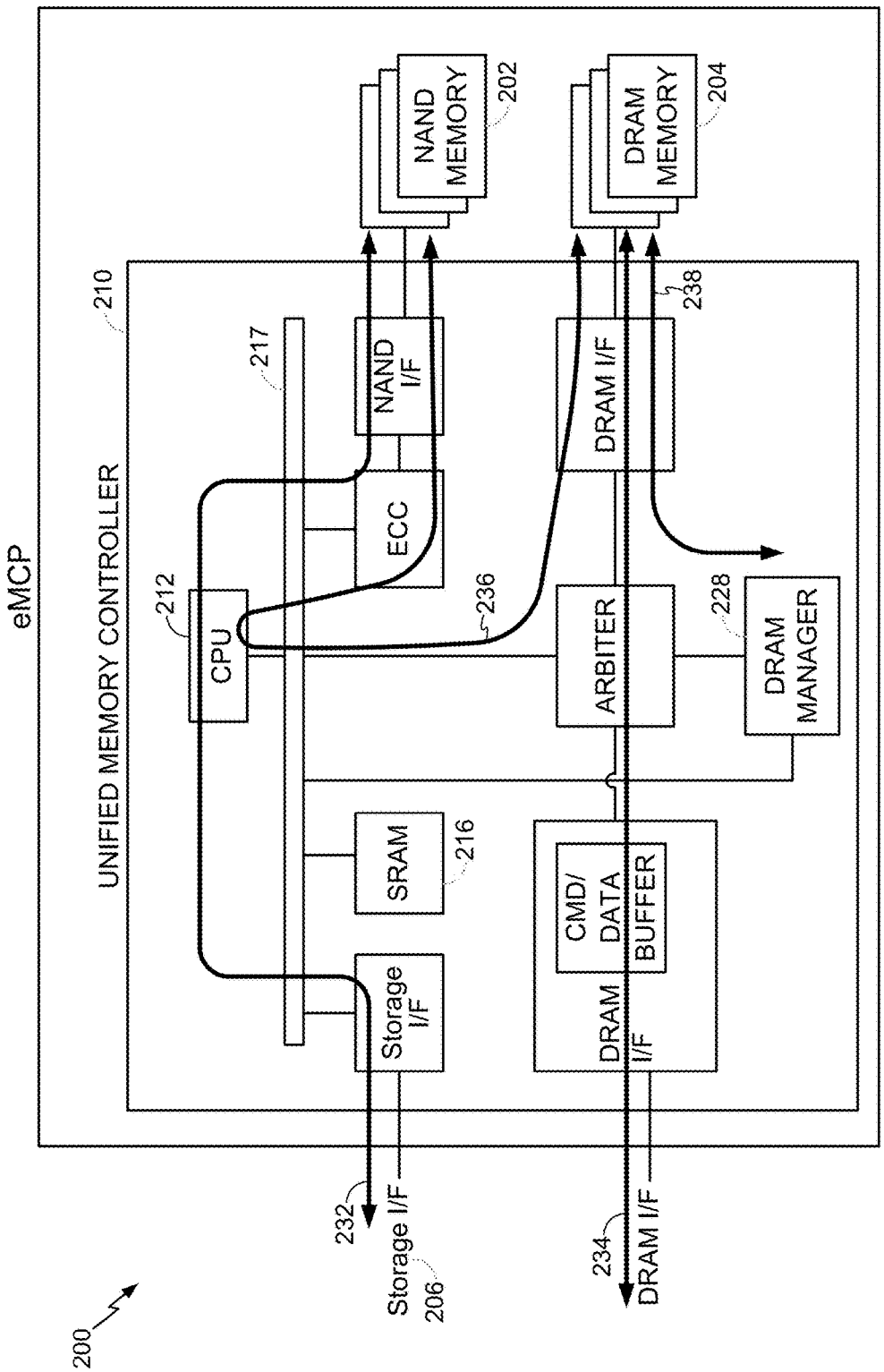
FIG. 2B is diagram illustrating data paths in an enhanced multi-chip package (eMCP) including a unified memory controller (UMC) according to aspects of the present disclosure.

One advantage of the eMCP 200, according to aspects of the present disclosure, is the ability to share one controller to manage two different types of memory. Referring to FIG. 2B, the unified memory controller 210 according aspects of the present disclosure includes the DRAM manager 228 that allows direct control of the second memory 204 along path 238, for example. The use of a single unified memory controller 210 allows sharing of various resources of the controller such as the CPU 212, SRAM 216, built in self-test (BIST) circuitry (not shown), etc. This reduces total controller cost and size compared to the cost of implementing a separate controller for each of the two different memory types.

The eMCP 200 according to aspects of the present disclosure allows host access to the first memory 202 in a traditional manner along a path 232 between the first host interface 206 and the first memory 202 via the unified memory controller bus 217 and CPU 121, for example. The eMCP 200 also allows host access to the second memory 204 in a traditional manner along path 234 which does not involve interaction with the unified memory controller bus 217 or the CPU 212, for example.

Another advantage of the eMCP 200 according to aspects of the present disclosure is the ability of the unified memory controller 210 to access the second memory 204 (e.g., along path 236) to aid in performing management of the first memory 202. For example, because the SRAM 216, which is used to perform control functions of the first memory 202, is generally much smaller and more expensive than DRAM, access to the DRAM by the unified memory controller 210 allows more efficient control of first memory 202. Providing controller access to the DRAM saves cost compared to increasing the SRAM as part of the controller.

Similarly, aspects of the present disclosure allow a nonvolatile memory type on the eMCP 200 to be used for storing information for management of a volatile memory type on the eMCP 200. For example, because NAND memory is nonvolatile and DRAM memory is volatile, information to manage the DRAM (second memory 204) may be stored in the NAND memory (first memory 202) via path 236, for example. The data from the NAND memory may then be used to manage the DRAM more efficiently.

The eMCP 200 may include an arbiter 230 which may perform arbitration functions when two accesses of the DRAM (second memory 204) are initiated at the same time, for example. The eMCP 200 may also include a command data buffer 226 that may store a pending command and or data related to a DRAM access that is delayed by the arbiter 230 while another DRAM access is completed, for example.

Although aspects of the present disclosure are described with reference to eMCP designs that include more than one host interface, such as the first host interface 206 and the second host interface 208 shown in FIG. 2, it should be understood that other eMCP designs may include a single host interface. For example, the eMCP 200 shown in FIG. 2A may have a single host interface according to an aspect of the present disclosure. The single host interface may be the same type as the first host interface 206 or may be the same type as the second host interface 208, for example.

Although aspects of the present disclosure are described with reference to eMCP designs in which the heterogeneous memory types include NAND flash memory and DRAM, it should be understood that other memory types may be implemented on an eMCP with a unified memory controller according to aspects of the present disclosure. For example, other heterogeneous memory types that may be implemented with a unified memory controller according to aspects of the present disclosure include magnetic random access memory (MRAM) and DRAM; MRAM and NAND memory, or PCRAM and NAND memory, etc.

Figure 3:
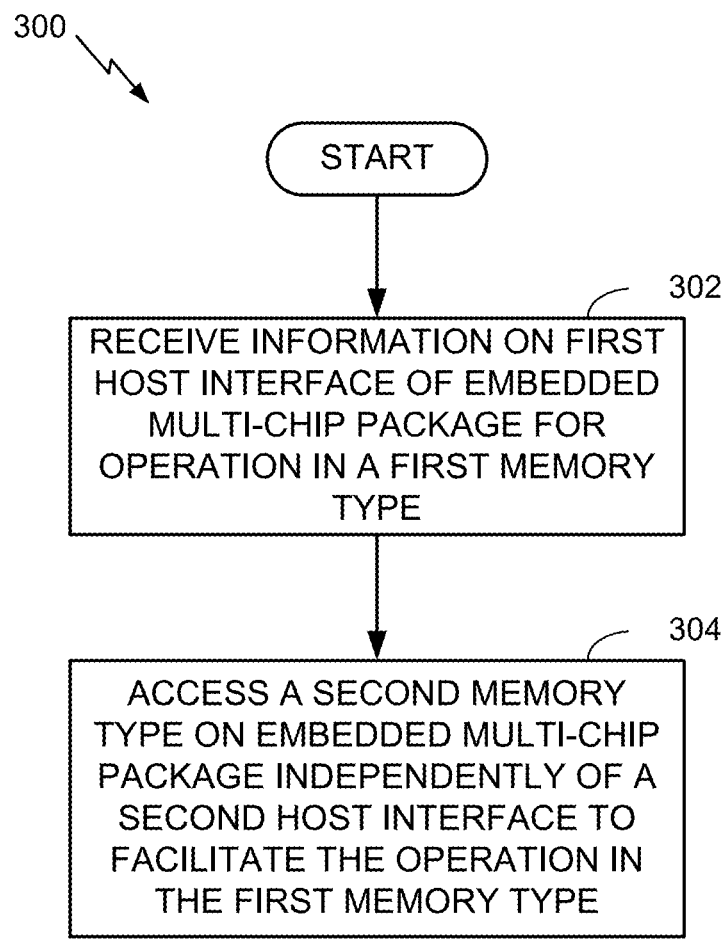
FIG. 3 is a process flow diagram illustrating a memory interface method according to aspects of the present disclosure.

FIG. 3 is a process flow diagram illustrating a memory interface method 300 according to an aspect of the present disclosure. In block 302, the memory interface method 300 includes receiving information from a host on a first host interface of an embedded multi-chip package. The information can be data for storage in a first memory of a first memory type on the multi-chip package. The information can also be a request for data stored in the first memory on the multi-chip package. In block 304, the memory interface method 300 includes accessing a second memory of a second memory type on the multi-chip package. The accessing occurs independently of a second host interface of the multi-chip package. The accessing can be to store the data in the first memory or to retrieve the data from the first memory.

A memory interface apparatus according to an aspect of the present disclosure includes means for receiving data from a host on a first host interface of a multi-chip package, and means for accessing a second memory of a second memory type on the multi-chip package. The means for receiving data from a host may include the first host interface circuitry 214 coupled to the first host interface 206 of the eMCP 200 shown in FIG. 2, for example. The means for accessing a second memory independently of the second host interface may include the DRAM manager 228 coupled to the unified memory controller bus 217 as shown in FIG. 2, for example.

In another configuration, the aforementioned means may be any module or any apparatus configured to perform the functions recited by the aforementioned means. Although specific means have been set forth, it will be appreciated by those skilled in the art that not all of the disclosed means are required to practice the disclosed configurations. Moreover, certain well known means have not been described, to maintain focus on the disclosure.

Figure 4:
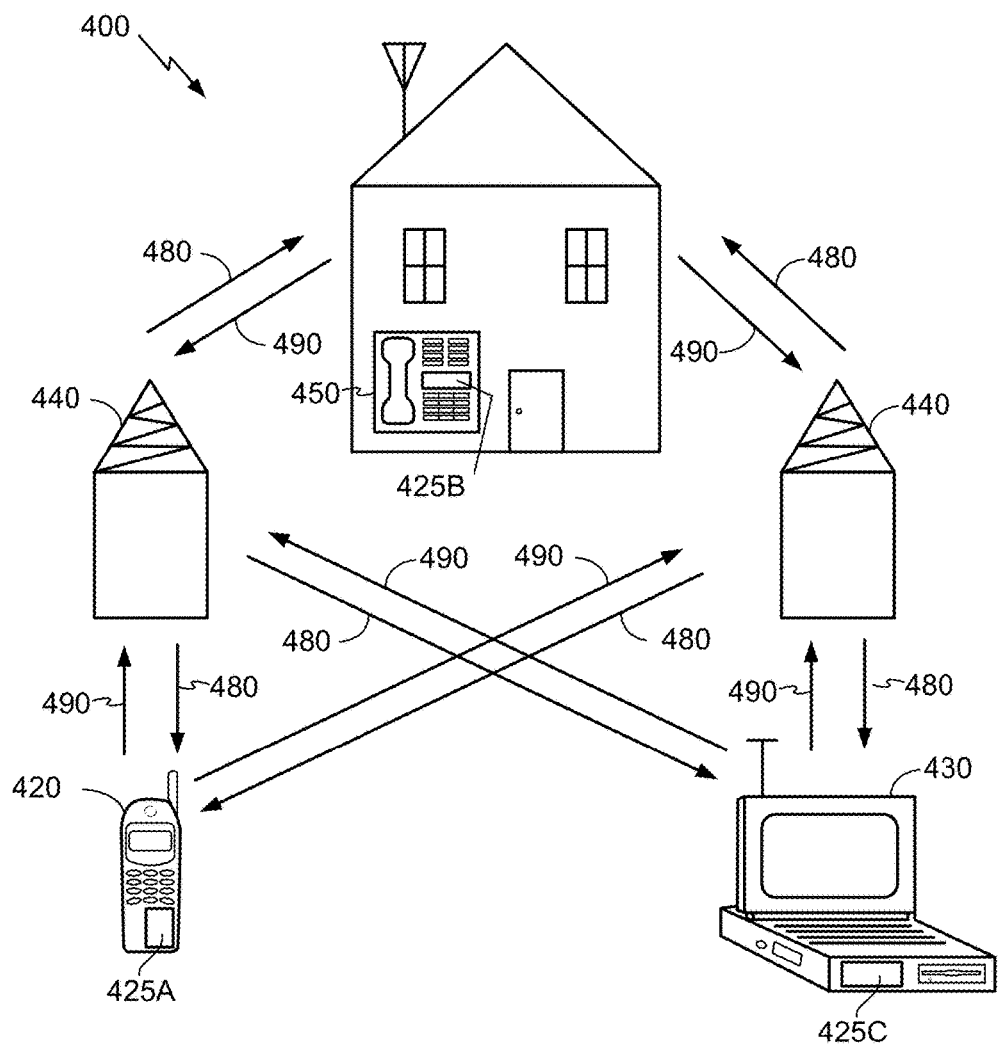
FIG. 4 is a block diagram showing an exemplary wireless communication system in which a configuration of the disclosure may be advantageously employed.

FIG. 4 is a block diagram showing an exemplary wireless communication system 400 in which an aspect of the disclosure may be advantageously employed. For purposes of illustration, FIG. 4 shows three remote units 420, 430, and 450 and two base stations 440. It will be recognized that wireless communication systems may have many more remote units and base stations. Remote units 420, 430, and 450 include IC devices 425A, 425C and 425B that include the disclosed eMCP. It will be recognized that other devices may also include the disclosed eMCP, such as the base stations, switching devices, and network equipment. FIG. 4 shows forward link signals 480 from the base station 440 to the remote units 420, 430, and 450 and reverse link signals 490 from the remote units 420, 430, and 450 to base stations 440.

In FIG. 4, remote unit 420 is shown as a mobile telephone, remote unit 430 is shown as a portable computer, and remote unit 450 is shown as a fixed location remote unit in a wireless local loop system. For example, the remote units may be mobile phones, hand-held personal communication systems (PCS) units, portable data units such as personal data assistants, GPS enabled devices, navigation devices, set top boxes, music players, video players, entertainment units, fixed location data units such as meter reading equipment, or other devices that store or retrieve data or computer instructions, or combinations thereof. Although FIG. 4 illustrates remote units according to the teachings of the disclosure, the disclosure is not limited to these exemplary illustrated units. Aspects of the disclosure may be suitably employed in many devices which include the disclosed eMCP.

Figure 5:
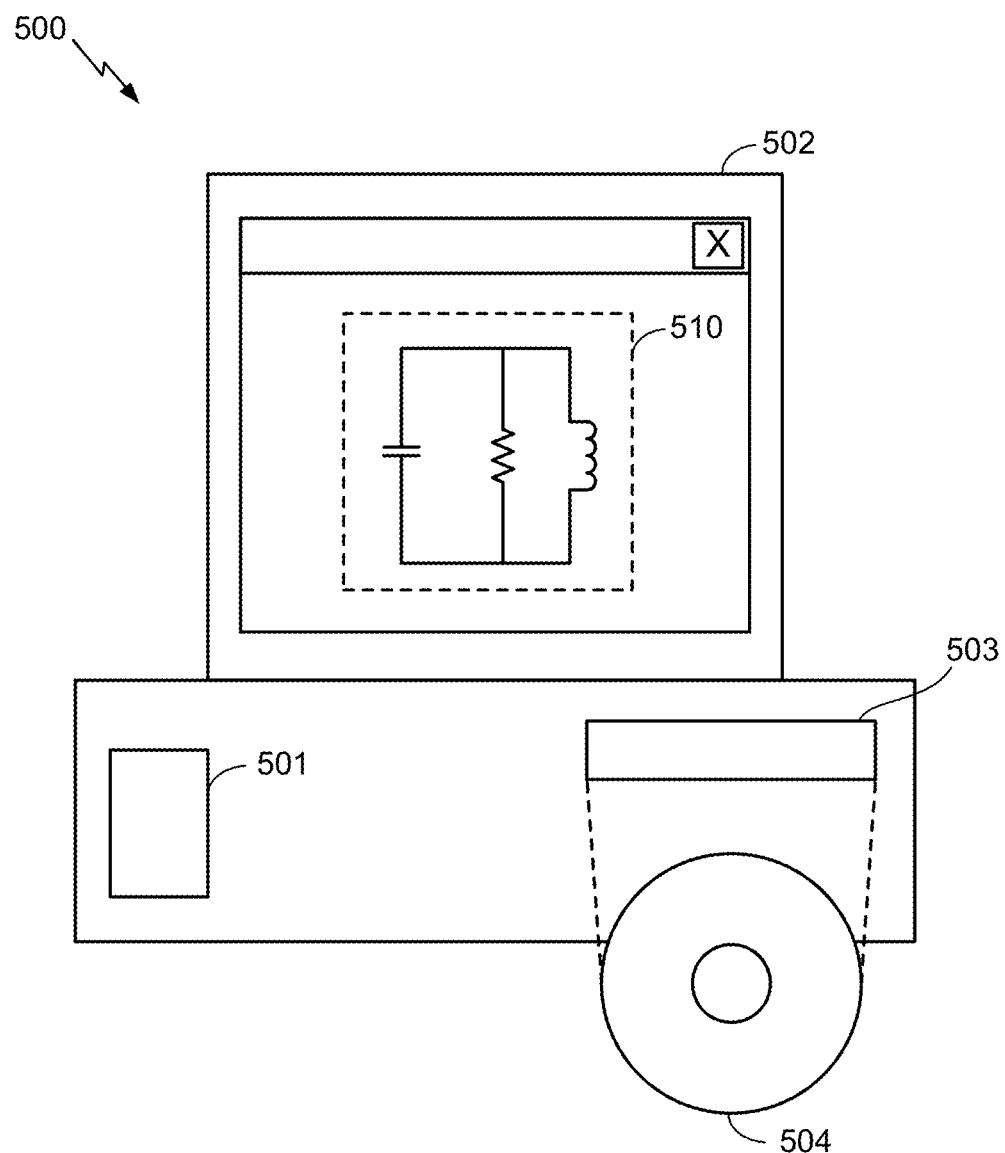
FIG. 5 is a block diagram illustrating a design workstation used for circuit, layout, and logic design of a semiconductor component according to one configuration.

FIG. 5 is a block diagram illustrating a design workstation used for circuit, layout, and logic design of a semiconductor component, such as the eMCP disclosed above. A design workstation 500 includes a hard disk 501 containing operating system software, support files, and design software such as Cadence or OrCAD. The design workstation 500 also includes a display 502 to facilitate design of a circuit design 510 or a semiconductor component 512 such as an eMCP. A storage medium 504 is provided for tangibly storing the circuit design 510 or the semiconductor component 512. The circuit design 510 or the semiconductor component 512 may be stored on the storage medium 504 in a file format such as GDSII or GERBER. The storage medium 504 may be a CD-ROM, DVD, hard disk, flash memory, or other appropriate device. Furthermore, the design workstation 500 includes a drive apparatus 503 for accepting input from or writing output to the storage medium 504.

Data recorded on the storage medium 504 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 504 facilitates the design of the circuit design 510 or the semiconductor component 512 by decreasing the number of processes for designing semiconductor wafers.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, although SRAM and MRAM were described as types of memories, other memory types are also contemplated, such as DRAM, PCRAM, etc. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. An apparatus comprising:
   at least one first memory of a first memory type;
   at least one second memory of a second memory type different from the first memory type, the first memory and the second memory integrated in a multi-chip package;
   a first host interface link of the multi-chip package;
   a second host interface link of the multi-chip package, the second host interface link separate and independent from the first host interface link of the multi-chip package; and
   a unified memory controller (UMC) integrated in the multi-chip package, comprising:
      a first memory interface circuit directly coupled to the first memory through a first memory link,
      a second memory interface circuit directly coupled to the second memory through a second memory link, in which the first memory interface circuit is separate from the second memory interface circuit to support access to the first memory through only the first memory link coupled to the first memory interface circuit, independent from access to the second memory through only the second memory link coupled to the second memory interface circuit,
      a first host interface circuit directly coupled between the UMC and the first host interface link and separate from the first memory interface circuit,
      a second host interface circuit directly coupled between the UMC and the second host interface link and separate from the second memory interface circuit, the UMC being configured to access the first memory to control and utilize the second memory independent of the first host interface link;
   a central processing unit (CPU) coupled to the first host interface circuit and the first memory interface circuit via a memory controller bus, and the CPU coupled to the second host interface circuit and the second memory interface circuit through an arbiter; and
   a dedicated memory manager coupled to the second memory through the second memory interface circuit, the dedicated memory manager configured to control the second memory independent from the CPU and the unified memory controller bus, but not the first memory.

2. The apparatus of claim 1, in which the UMC is configured to independently access the first memory for performing management of the second memory during a host access to the second memory via the second host interface link.

3. The apparatus of claim 1, in which the UMC is configured to independently access the first memory for enhancing performance of the second memory during a host access to the second memory via the second host interface link.

4. The apparatus of claim 1, in which the UMC is configured to independently access the first memory for reducing power usage by the second memory during a host access to the second memory via the second host interface link.

5. The apparatus of claim 1, in which the UMC is configured to control the first memory and the second memory.

6. The apparatus of claim 1, in which the first memory is configured on a first chip of the multi-chip package, and the second memory is configured on a second chip of the multi-chip package.

7. The apparatus of claim 1, in which the first memory comprises NAND memory and the second memory comprises dynamic random access memory (DRAM).

8. The apparatus of claim 1, integrated in a mobile phone, a set top box, a music player, a video player, an entertainment unit, a navigation device, a computer, a hand-held personal communication systems (PCS) unit, a portable data unit, and/or a fixed location data unit.

9. An apparatus comprising:
at least one first memory of a first memory type;
at least one second memory of a second memory type different from the first memory type, the first memory and the second memory integrated in a multi-chip package;
a first host interface link;
a second host interface link separate and independent from the first host interface link of the multi-chip package; and
a unified memory controller (UMC) integrated in the multi-chip package, comprising:
a first memory interface circuit directly coupled to the first memory through a first memory link,
a second memory interface circuit directly coupled to the second memory through a second memory link, in which the first memory interface circuit is separate from the second memory interface circuit to support access to the first memory through only the first memory link coupled to the first memory interface circuit, independent from access to the second memory through only the second memory link coupled to the second memory interface circuit,
a first host interface circuit directly coupled between the UMC and the first host interface link and separate from the first memory interface circuit,
a second host interface circuit directly coupled between the UMC and the second host interface link and separate from the second memory interface circuit, in which the UMC is configured to utilize the first memory to assist a host access to the second memory via the second host interface link,
a central processing unit (CPU) coupled to the first host interface circuit and the first memory interface circuit via a memory controller bus, and the CPU coupled to the second host interface circuit and the second memory interface circuit through an arbiter; and
a dedicated memory manager coupled to the second memory through the second memory interface circuit, the dedicated memory manager configured to control the second memory independent from the CPU and the unified memory controller bus, but not the first memory.

10. The apparatus of claim 9, integrated in a mobile phone, a set top box, a music player, a video player, an entertainment unit, a navigation device, a computer, a hand-held personal communication systems (PCS) unit, a portable data unit, and/or a fixed location data unit.

11. A memory interface method, comprising:
receiving information from a host on a first host interface link of a multi-chip package for an operation in a first memory of a first memory type on the multi-chip package;
accessing a second memory of a second memory type to enable the operation in the first memory, in response to the information from the host, the second memory coupled to a second host interface link through an arbiter and a memory interface circuit of the multi-chip package separate and independent from the first host interface link of the multi-chip package; and
accessing, by a central processing unit (CPU), the second memory through the arbiter and the memory interface circuit independent from the first host interface link, the second host interface link, and a dedicated memory manager of the second memory.

12. The method of claim 11, in which the information comprises data for storage, and the operation comprises storage of the data.

13. The method of claim 12, further comprising managing both the first memory and the second memory on the multi-chip package by a single controller on the multi-chip package.

14. The method of claim 12, further comprising accessing the first memory for management of the second memory.

15. The method of claim 11, in which the information comprises a request for data stored in the first memory and the operation comprises retrieval of the data.

16. The method of claim 11, further comprising integrating the multi-chip package into a mobile phone, a set top box, a music player, a video player, an entertainment unit, a navigation device, a computer, a hand-held personal communication systems (PCS) unit, a portable data unit, and/or a fixed location data unit.

17. A memory interface apparatus, comprising:
means for receiving data from a host on a first host interface link of a multi-chip package for storage in a first memory of a first memory type on the multi-chip package;
means for accessing a second memory of a second memory type to enable the storage in the first memory, in response to the data received from the host via the first host interface link, the means for accessing coupled to a second host interface link of the multi-chip package separate and independent from the first host interface link of the multi-chip package; and
a central processing unit (CPU) configured to access the second memory through the arbiter and the memory interface circuit independent from the first host interface link, the second host interface link, and a dedicated memory manager of the second memory.

18. The apparatus of claim 17, integrated in a mobile phone, a set top box, a music player, a video player, an entertainment unit, a navigation device, a computer, a hand-held personal communication systems (PCS) unit, a portable data unit, and/or a fixed location data unit.

19. A memory interface method, comprising steps of:
receiving information from a host on a first host interface link of a multi-chip package for an operation in a first memory of a first memory type on the multi-chip package;
accessing a second memory of a second memory type to enable the operation in the first memory, in response to the information from the host, the second memory coupled to a second host interface link of the multi-chip package separate and independent from the first host interface link of the multi-chip package; and accessing, by a central processing unit (CPU), the second memory through the arbiter and the memory interface circuit independent from the first host interface link, the second host interface link, and a dedicated memory manager of the second memory.

20. The method of claim 19, further comprising steps of integrating the multi-chip package into a mobile phone, a set top box, a music player, a video player, an entertainment unit, a navigation device, a computer, a hand-held personal communication systems (PCS) unit, a portable data unit, and/or a fixed location data unit.

21. The apparatus of claim 1, in which the memory controller bus directly couples the first host interface circuit to the first memory interface circuit through error correction code circuitry.

22. The apparatus of claim 9, in which the arbiter directly couples the second host interface circuit to the second memory interface circuit.

23. The apparatus of claim 1, in which the UMC is configured to access a mapping table stored in the first memory to convert a received logical address to a corresponding physical address in the second memory.

24. The apparatus of claim 9, in which the UMC is configured to access a mapping table stored in the first memory to convert a received logical address to a corresponding physical address in the second memory.

25. The method of claim 11, in which the accessing comprises converting a received logical address to a corresponding physical address of the first memory using a mapping table stored in the second memory.

* * * * *